United States Patent [19]

Rosiak et al.

[11] Patent Number: 4,761,341

[45] Date of Patent: Aug. 2, 1988

[54] TEMPORARILY BONDED CONSTRUCTIONS

[75] Inventors: Edward A. Rosiak, Lisle; Frank A. Bozich, Clarendon Hills, both of Ill.

[73] Assignee: National Starch and Chemical Corporation, Bridgewater, N.J.

[21] Appl. No.: 37,105

[22] Filed: Apr. 10, 1987

Related U.S. Application Data

[63] Continuation of Ser. No. 743,334, Jun. 10, 1985, abandoned.

[51] Int. Cl.$^4$ .............................. C09J 7/02; C09J 3/12; B32B 27/06
[52] U.S. Cl. .................................... 428/512; 428/441; 428/451; 428/462; 428/515; 524/505; 156/334
[58] Field of Search ............... 525/534; 428/512, 515, 428/441, 451, 462, 355; 156/334

[56] References Cited

U.S. PATENT DOCUMENTS

| | | | |
|---|---|---|---|
| 3,239,478 | 3/1966 | Harlan | 525/316 |
| 3,827,999 | 8/1974 | Crossland | 524/500 |
| 4,136,699 | 1/1979 | Collins et al. | 128/290 |

FOREIGN PATENT DOCUMENTS 0027606  4/1981  Fed. Rep. of Germany ...... 524/534

*Primary Examiner*—John C. Bleutge
*Assistant Examiner*—A. Carrillo
*Attorney, Agent, or Firm*—Ellen T. Dec; Edwin M. Szala

[57] ABSTRACT

Temporarily bonded constructions, i.e., credit cards attached to paper stock for mailing to customers, may be prepared utilizing a non-pressure sensitive hot melt adhesive comprising 5–40% of specific A-B.A block copolymers and 95–60% plasticizing oil.

11 Claims, No Drawings

TEMPORARILY BONDED CONSTRUCTIONS

This application is a continuation of application Ser. No. 743,334, filed June 10, 1985, now abandoned.

BACKGROUND OF THE INVENTION

This invention relates to temporarily bonded construction utilizing a non-pressure sensitive hot melt adhesive which comprises specific A-B-A block copolymers and relatively high levels of plasticizing oil.

There has been an increasing need in recent years for adhesives to be used in applications requiring temporary bonding properties, i.e., adhesives which will bond an item to a substrate for a unlimited period, which bond may be easily broken when desired. One of the largest applications for such adhesives is for the attachment of plastic cards (e.g., credit cards) to paper stock for mailing to a customer. Upon receipt, the card can be readily removed by peeling it from the paper stock.

Previous attempts to provide temporary bonding involved the use of non-pressure sensitive rubber latex adhesives or hot melt pressure sensitive adhesives, i.e., adhesives which are permanently tacky at room temperature and which adhere on mere contact with the surfaces to which they are applied. In the case of both types of adhesive, removal of the card from the paper stock was often accompanied by some tearing of the paper and it was necessary for the customer to scrape or otherwise remove the residual tacky adhesive, and often some paper, from the card prior to use. While some of these problems could be overcome using specially treated release paper, this coated stock is costly and generally cannot be printed upon.

There is therefore a continuing need for an adhesive capable of forming temporary bonds, and in particular, capable of forming temporary bonds between plastic and preprinted stock. The latter requirement is especially important in applications where, after removal of the card, the customer is to sign and return the preprinted paper substrate for further processing either by hand or on automated equipment and wherein tearing of the paper or the presence of residual tacky adhesive either on the card or the paper stock would be unacceptable.

SUMMARY OF THE INVENTION

We have now found that a hot melt adhesive suitable for temporary bonding applications may be prepared from specific A-B-A type block copolymers and oil. The resulting non-pressure sensitive adhesives are resistant to shear but have low tensile strength, have little or no residual tack and are not subject to cohesive failure. As such, they are especially suited for temporary bonding applications where easy releasability and clean strippability are critical.

Thus, the present invention is directed to temporarily bonded constructions comprising: a plastic, paper, glass, ceramic or metal substrate attached to a base stock substrate utilizing a non-pressure sensitive hot melt adhesive, the adhesive comprising:

(a) 5-40% by weight of at least one A-B-A block copolymer wherein the A blocks are non-elastomeric polymer blocks which, as homopolymers have glass transition temperatures above 20° C., while the elastomeric polymer blocks B are isoprene or butadiene which is partially or substantially hydrogenated;

(b) 95-60% by weight plasticizing oil; and (c) 0.1 to 2% by weight of a stabilizer.

While temporarily bonded constructions formed from paper base stock sheets and plastic, e.g., credit cards, are described in detail herein, the invention is not intended to be limited thereto and other constructions requiring temporary bonding are also contemplated to be within the scope of the invention. In particular, such other uses may include the attachment of a plastic or glass vial containing a sample perfume fragrance or the like to an explanatory card; the insertion of multiple containers within a preformed package for safe transport; the attachment of reply cards to magazine stock; collating of paper to paper in business forms; and the attachment of a coin to a printed survey form.

DETAILED DESCRIPTION OF THE PREFERRED EMBODIMENTS

Hot melt adhesives are 100% solid materials which do not contain or require any solvents. They are solid materials at room temperature but, on application of heat, melt to a liquid or fluid state in which form they are applied to a substrate. On cooling, the adhesive regains its solid form and gains its cohesive strength. In this regard, hot melt adhesives differ from other types of adhesives which achieve the solid state through evaporation or removal of solvents or by polymerization. Hot melt adhesives may be formulated to be pressure sensitive, i.e., aggressively tacky at room temperature so that a bond may be found on mere contact between the two surfaces or, in contrast, to be relatively free of tack at room temperature as required herein.

In formulating the non-pressure sensitive adhesives used in the present invention, the rubber copolymers employed are block or multi-block copolymers having the general configuration:

A-B-A or A-B-A-B-A-B wherein the polymer blocks A are non-elastomeric polymer blocks which, as homopolymers have glass transition temperatures above 20° C., while the elastomeric polymer blocks B are isoprene, or butadiene which is partially or substantially hydrogenated or mixtures thereof. Further, the copolymers may be linear or branched. Typical branched structures contain an elastomeric portion with at least three branches which can radiate out from a central hub or can be otherwise coupled together.

The non-elastomeric blocks which make up 14 to 30% by weight of the block copolymer may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric polymer blocks may be derived from alpha olefins, alkylene oxides, acetals, urethanes, etc. Styrene is preferred.

The elastomeric block component making up the remainder of the copolymer is isoprene or butadiene which is hydrogenated as taught, for example, in U.S. Pat. No. 3,700,633. This hydrogenation of butadiene may be either partial or substantially complete. Selected conditions may be employed for example to hydrogenate the elastomeric butadiene block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete.

Typical of the rubber block copolymers useful herein are the polystyrene-polyisoprene-polystyrene and polystyrene-poly(ethylene-butylene)-polystyrene. These copolymers may be prepared using methods taught, for example, U.S. Pat. Nos. 3,239,478; 3,427,269; 3,700,633; 3,753,936; and 3,932,327. Alternatively, some may be obtained from Shell Chemical Co. under the trademarks Kraton D1107, D1111, D1117, G1650, G1652 and G1657 and from Phillips Chemical Co. under the trademarks Solprene 418 and 423. Also useful herein is Kraton GX 1726 which comprises a 30/70 blend of a polystyrene-poly(ethylene-butylene)polystyrene tri-block copolymer and a polystyrene-poly(ethylene-butylene) diblock copolymer. Most preferred for use herein are the block copolymers containing the hydrogenated butadiene midblock, in particular those available from Shell under the trademarks Kraton G1650, G1652 and G1657.

The plasticizing (extending) oils are used in the adhesive in amounts of 60% to about 95%, preferably 70 to 80%, by weight. The above broadly includes not only the usual plasticizing oils such as the petroleum derived hydrocarbon oils (primarily mineral oil), but also contemplates the use of the olefin oligomers and low molecular weight polymers. The petroleum derived oils which may be employed are relatively high boiling materials containing only a minor portion of aromatic hydrocarbons (preferably less than 30% and, more particularly, less than 15% by weight of the oil). Alternatively, the oil may be totally non-aromatic. The oligomers may be polypropylenes, polybutenes, hydrogenated polyisoprene, hydrogenated polybutadiene, or the like having average molecular weights between about 350 and about 10,000.

Among the applicable stabilizers or antioxidants utilized herein are included high molecular weight hindered phenols and multifunctional phenols such as sulfur and phosphorus-containing phenols. Hindered phenols are well known to those skilled in the art and may be characterized as phenolic compounds which also contain sterically bulky radicals in close proximity to the phenolic hydroxyl group hereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; n-octadecyl-3,(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octylthio)-1,2,5-triazine; di-n-octadecyl 3,5-di-tert-butyl-4-hydroxybenzyl-phosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful in distearylthiodipropionate.

These stabilizers are generally present in amounts of about 0.1 to 1.5 weight percent, preferably 0.25 to 1.0%.

Other additives such as plasticizers, pigments, dystuffs, etc., conventionally added to hot melt adhesives for the various end uses contemplated may also be incorporated in minor amounts into the formulations of the present invention.

Additionally, it may be desirable to replace a portion of the oil with small amounts of a tackifier to further plasticize the adhesive. When present, the tackifier is used in amounts to replace up to about 45% of the oil, a quantity not sufficient to render the adhesive pressure-sensitive. Suitable tackifiers include liquid tackifying resins such as Wingtak 10 or conventional solid tackifiers such as hydrocarbon resins, synthetic polyterpenes, rosin esters, natural terpenes, and the like. More particularly, the useful tackifying resins include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natured terpenes, e.g., styrene/terpene and alpha methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof; and (a) aliphatic - aromatic copolymers and their hydrogenated derivatives, for example, coumarone-indene resins.

The desirability and selection of the particular tackifying agent is, in large part, dependent upon the specific block copolymer employed. In the case of adhesives containing a copolymer with an isoprene mid-block, the use of a tackifier is generally not desirable; however those containing copolymers of hydrogenated butadiene will be improved by the use of small amounts of a tackifier.

The adhesive compositions are prepared by blending the components at a temperature of about 130°-180° C. until a homogeneous blend is obtained, approximately 2 hours. Various methods of blending are known in the art and any method that produces a homogeneous blend is satisfactory. An exemplary procedure involves placing the block copolymer, stabilizer or antioxidant, and any optional additives whose presence may be desired, together with approximately half the oil in a jacketed mixing kettle, preferably in a low shear stainless steel kettle which is equipped with rotors and thereupon raising the temperature to a range of from about 120° to 170° C. When the blend has dissolved, stirring is continued and the remainder of the oil and any tackifying resin which may be employed are added over a short period in order to avoid the formation of lumps. Mixing and heating are continued until a smooth, homogeneous mass is obtained whereupon the remainder of the tackifying resin and the oil are thoroughly and uniformly admixed therewith. The resultant hot melt adhesives are generally produced in bulk form and packaged in release coated containers.

The base substrate employed in forming the constructions of the invention may be paper; plastic film, sheets and foils; textiles; glass; ceramic; and metal foils and sheets. As described herein, the substrate is most commonly paper which may or may not be preprinted on one or both sides.

The other surface in the construction is generally plastic, although the invention also contemplates use of metal, glass or paper as the item to be temporarily bonded to the base substrate.

The hot melt adhesives are applied to the base substrate in thin film form in a molten state at a temperature greater than about 130° C. The adhesives may be applied using conventional techniques as by use of a roller, dauber plus doctor blade, printed dots via heated offset rollers, extrusion gun or the like. Since the specific hot melt adhesives used are not pressure sensitive and therefore lack sufficient tack to form a bond at room temperature, the item to be attached to the base substrate is generally affixed while the adhesive is still in its molten or partially molten form, i.e., at temperatures of at least about 100° C. Depending, however, on the degree of plasticization of the block copolymers chosen and the nature of the substrates to be bonded, a relatively weak bond, sufficient for some temporarily bonded constructions, may be formed at room temperature.

This invention can be further illustrated by the following examples or preferred embodiments thereof, although it will be understood that these examples are included merely for purposes of illustration and are not intended to limit the scope of the invention unless otherwise specifically indicated.

EXAMPLES

The following examples show the various block copolymers and relative amounts that can be used in preparing non-pressure sensitive adhesives for use in the temporary bonded constructions of the present invention. Also noted in Table I are the adhesive properties observed for each of the compositions. As those skilled in the art will recognize, the adhesive requirements will vary depending upon the polarity of the substrates to be bonded. It will be seen from the following results that the type of polymer and the molecular weight of the polymer as well as the amount of the plasticizing oil used will all have an influence on the adhesive wetting ability of the composition and it is left for the artisan to select the appropriate formulation or blend thereof for the intended end use application.

In preparing the samples described in Table I, the block copolymer, oil, and any optional components were mixed in a low shear stainless steel vessel at a temperature of 150° C. until a homogeneous mass was obtained.

Small quantities of the samples designated 2, 5, 7, 8 and 11 were heated until molten and applied in a bead form at 180° C. to paper board stock. A plastic credit card was immediately affixed thereto with application of slight pressure. The construction was held overnight under ambient conditions. The card was then easily removed from the stock with a clean release of the adhesive from the credit card. The adhesive was then readily removable from the paper board.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

TABLE I

| Sample[1] | Polymer | Amount | Oil[2] | Viscosity at 145° C. | Comments |
|---|---|---|---|---|---|
| 1 | Kraton G 1652 | 40 | 60 | 9675 | Tough, clear, dry |
| 2 | Kraton G 1652 | 30 | 70 | 6440 | Tough, rubbery |
| 3 | Kraton G 1650 / Kraton GX 17726 | 20 / 10 | 70 | 2225 | Tough, dry rubbery, clear |
| 4 | Kraton G 1650[3] | 20 | 55 | 1880 | Highly plasticized, greater adhesion |
| 5 | Kraton G 1650 | 20 | 80 | 1350 | Dry, clear, rubbery, low tack |
| 6 | Kraton G 1650 / Kraton D 1107 | 12 / 17 | 73 | 950 | Very slightly plasticized |
| 7 | Kraton G 1657 | 20 | 80 | 900 | Greater adhesion, soft clear, slightly plasticized |
| 8 | Kraton D 1117 | 30 | 70 | 625 | Slightly cloudy, plasticized, greater adhesion |
| 9 | Kraton GX 1726 | 30 | 70 | 425 | Solid, slightly plasticized, lower cohesive strength, clear |
| 10 | Kraton D 1111 | 20 | 80 | 415 | Very plasticized |
| 11 | Kraton G 1650 | 15 | 85 | 375 | Clear, dry, rubbery |
| 12 | Kraton G 1650 | 10 | 90 | 74 | Soft, clear |

[1] 0.2 parts Irganox 1010, a pentaerythritol tetrakis-3(3,5 ditert-butyl-4-hydroxyphenyl propionate from Ciba Geigy was used as a stabilizer in all formulations
[2] Kaydol white mineral oil from Witco Chemical
[3] 25 parts glycerol ester of rosin replaced a portion of the oil

We claim:

1. A temporarily bonded construction comprising a plastic, paper, glass, ceramic or metal substrate attached to a paper base stock substrate utilizing a nonpressure sensitive hot melt adhesive, the adhesive consisting essentially of:
   (a) 5–40% by weight of at least one A-B-A block copolymer wherein the A blocks are non-elastomeric polymer blocks which, as homopolymers have glass transition temperatures above 20° C., and the elastomeric polymer blocks B are isoprene or butadiene which is partially or substantially hydrogenated.
   (b) 95–60% by weight plasticizing oil, and
   (c) 0.1 to 2% by weight of a stabilizer; wherein up to 45% by weight of the oil may be replaced by a tackifying resin provided the quantity of said resin is not sufficient to render the adhesive pressure sensitive.

2. The temporarily bonded contruction of claim 1 wherein the adhesive contains a block copolymer having a polystyrene non-elastomeric portion.

3. The temporarily bonded construction of claim 1 wherin the elastomeric ploymer block B in the adhesive is butadiene which is partially or substantially hydrogenated.

4. The temporarily bonded construction of claim 1 wherein the block copolymer in the adhesive is a polystyrene-polyisoprene-polystyrene copolymer.

5. The temporarily bonded construction of claim 1 wherein the adhesive consists essentially of 20 to 30% by weight of the block copolymer, 70 to 80% by weight of the oil and 0.25 to 1.0% of the stabilizer.

6. The temporarily bonded construction of claim 1 wherein the oil in the adhesive is mineral oil.

7. The temporarily bonded construction of claim 1 wherein up to 45% by weight of the oil is replaced by a tackifying resin provided the quantity of said resin is not sufficient to render the adhesive pressure sensitive.

8. The temporarily bonded contruction of claim 1 comprising a plastic card bonded to a paper base stock.

9. The temporarily bonded construction of claim 1 comprising a plastic or glass vial bonded to a paper base stock.

10. The temporarily bonded construction of claim 1 comprising a coin bonded to a paper base stock.

11. A methd for forming a temporarily bonded construction comprising the step of bonding a plastic, paper, glass, ceramic or metal substrate to a paper base stock substrate utilizing a non-pressure sensitive hot melt adhesive, the adhesive consisting essentially of:
   (a) 5–40% by weight of at least one A-B-A block copolymer wherein the A blocks are non-elastomeric polymer blocks which, as homopolymers have glass transition temperatures above 20° C., and the elastomeric polymer blocks B are isoprene or butadiene which is partially or substantially hydrogenated;
   (b) 95–60% by weight plasticizing oil, and
   (c) 0.1 to 2% by weight of a stabilizer; wherein up to 45% by weight of the oil may be replaced by a tackifying resin provided the quantity of said resin is not sufficient to render the adhesive pressure sensitive.

* * * * *